Feb. 20, 1934.    J. A. MAURER, JR    1,947,566
OPTICAL SYSTEM
Filed April 6, 1931    2 Sheets-Sheet 1
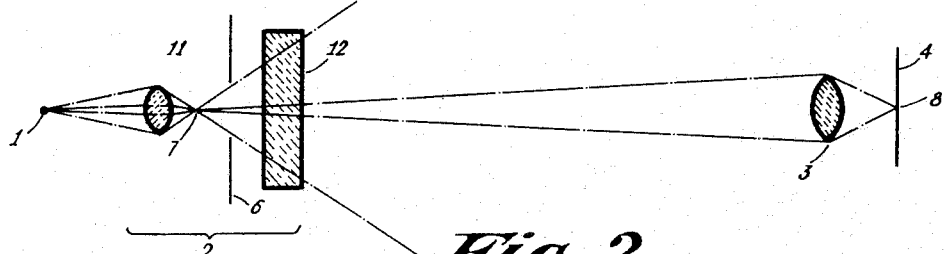
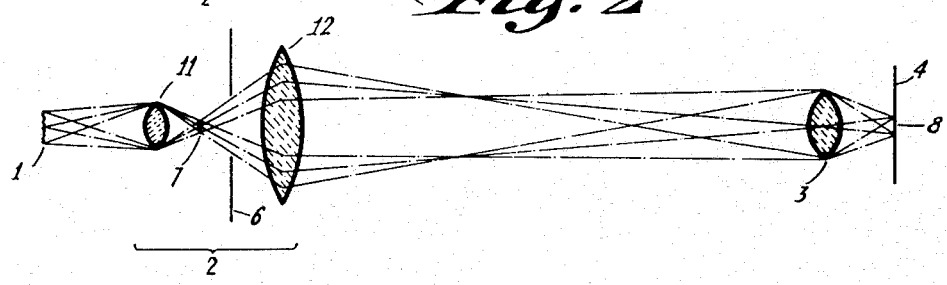
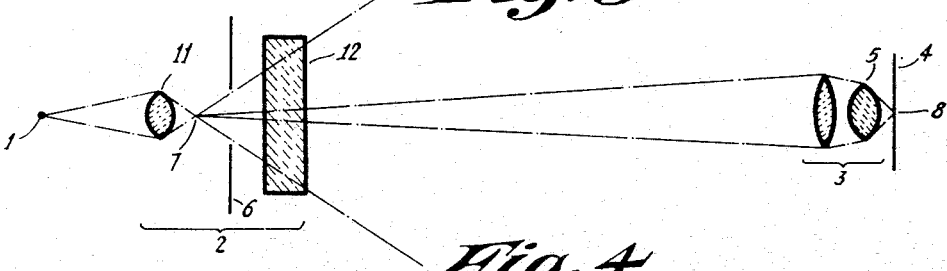
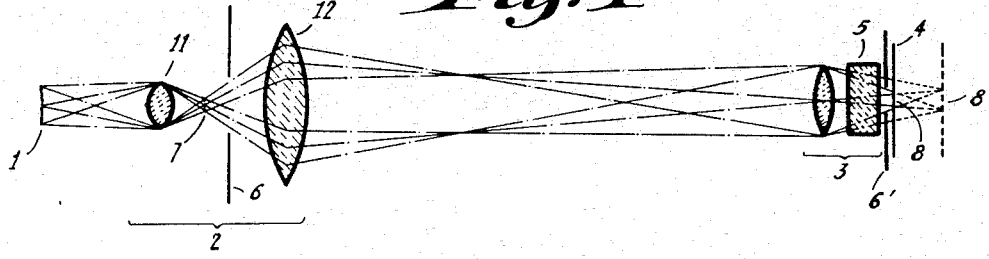
INVENTOR
J. A. MAURER, JR.
BY
ATTORNEY Feb. 20, 1934.  J. A. MAURER, JR  1,947,566
OPTICAL SYSTEM
Filed April 6, 1931  2 Sheets-Sheet 2
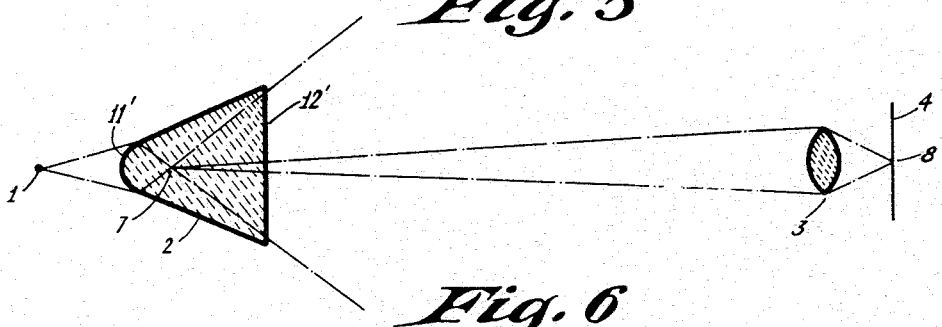
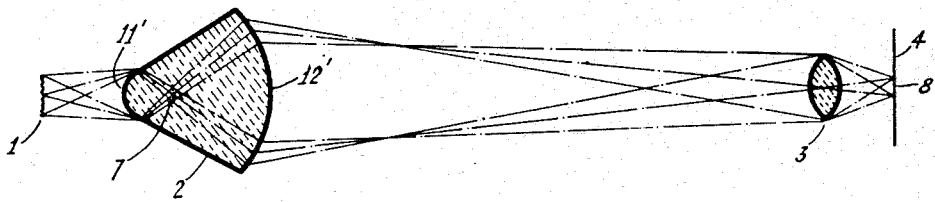
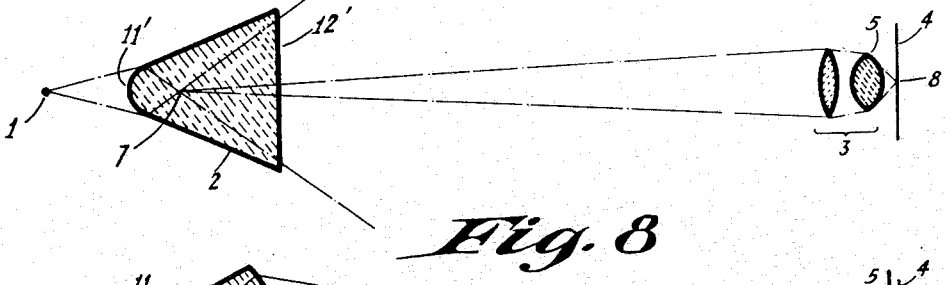
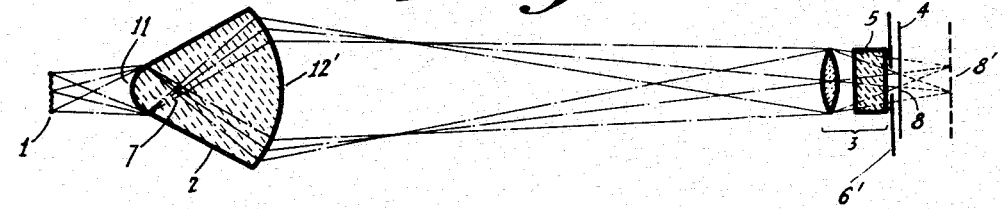
INVENTOR
J. A. MAURER, JR.
BY
ATTORNEY Patented Feb. 20, 1934

1,947,566

UNITED STATES PATENT OFFICE 1,947,566

OPTICAL SYSTEM

John A. Maurer, Jr., New York, N. Y., assignor to Radio Corporation of America, a corporation of Delaware Application April 6, 1931. Serial No. 528,097

2 Claims. (Cl. 88—24)

This invention relates to optical systems, and more particularly to such optical systems as are used in phonographic apparatus, such as of the photo-electric type, for producing a narrow linear image of either a primary or a secondary light source upon an image area such, for example, as the sound-track of a sound and picture film.

The present application pertains more particularly to such systems in which the dimensions of the final image are dependent upon the characteristics of the system rather than on the dimensions of the light-source or of a slit serving as a secondary source, and accordingly is related to my applications dockets 5317, 5318, 5320 and 5321, filed concurrently herewith and pertaining to collateral inventions of the same general kind. The present application, however, is characterized by the employment of a primary group of lenses having a sphero-cylindrical power and arranged to form a horizontal real image of the light-source reduced in its vertical dimension within such group of lenses, and the employment of a cylindrical lens between such image and the secondary group or objective lens.

One object of this invention is to produce such an optical system of reasonably high light efficiency and at the same time capable of producing an image of the necessary lateral attenuation.

Another object of this invention is to produce such a system which is capable of reasonable facility of manufacture.

Another object of this invention is to produce such a system which is capable of being manufactured at a reasonable cost under modern production methods.

Another object of this invention is to produce such a system which is adapted to reasonable facility and accuracy in installation.

Another object of this invention is to produce such a system which is adapted to or capable of using present commercially-available lenses or lenses adapted to present commercial manufacture.

Figure 1 is a vertical section of a preferred form of the invention.

Figure 2 is a horizontal section corresponding to Figure 1.

Figure 3 is a vertical section of a modification of Figure 1 employing an objective having a cylindrical component.

Figure 4 is a horizontal section corresponding to Figure 3.

Figure 5 is a vertical section of a second form of the invention.

Figure 6 is a horizontal section corresponding to Figure 5.

Figure 7 is a vertical section of a modification of Figure 5 employing an objective having a cylindrical component.

Figure 8 is a horizontal section corresponding to Figure 7.

In the above figures:

The light-source is indicated at "1".

The first or primary group of lenses is indicated at "2".

The objective or secondary group of lenses is indicated at "3".

The film or other image area is indicated at "4".

The cylindrical component of the objective, if any, is indicated at "5".

The diaphragm or limiting aperture is indicated at "6".

The objective diaphragm, where used, is indicated at "6'".

The first image of the source is indicated at "7".

The final functioning image is indicated at "8".

And a final virtual image is indicated at "8'".

Such other reference-numerals as may be common to two or more figures will be hereinafter more specifically pointed out.

The light in all cases is assumed to pass from left to right.

In the form of the invention shown in Figures 1, 2, and the modifications thereof in Figures 3 and 4:

The primary group 2 is composed of two lenses, a spherical lens 11 and a cylindrical lens 2. The spherical lens is of such power that it alone casts an image of the source 1 at the plane indicated by "7".

In this as well as in all the following modifications, the source 1 is preferably in the form of a high-intensity lamp filament of the helical type, but it may obviously be of any other appropriate type, such as a small arc-lamp, a linear filament, a Nernst glower, etc; or it may be a secondary source such as an illuminated aperture, or the reflector of a galvanometer or the equivalent as used in sound-recording apparatus or oscillographs. The objective 3 is shown as a double-convex spherical lens, but ordinarily would be of more complicated form, i. e. a microscope objective or the equivalent would be used. The cylindrical objective shown in Figures 3 and 4 may be constructed as shown, from a positive spherical lens and a positive cylindrical lens 5 of shorter focal length or it may be composed of a microscope objective provided with a cylindrical component, or it may be constructed as shown in my application Serial Number 523,284, filed March 17, 1931.

The positive spherical lens 11 is of such focal length that it forms an image of the source at 7, and this image is smaller in its vertical dimension than the source in the same ratio as the distances of the source and the image from the principal planes of the lens combination. The lateral extent of this image as imaged by the lens 12 upon the entrance-pupil of the second component 3, and thereby the length of the final image 8, is defined by the diaphragm 6.

The objective 3 is so positioned that it focuses an image of the line 7 upon the film or other image area 4 at 8.

In the form shown in Figures 3 and 4, the objective likewise forms a sharp image 8 in the vertical plane, but in the horizontal plane, due to the astigmatic nature of the objective, there is a tendency to form an image at 8' and the ends of the linear image would therefore not be sharply defined. I accordingly place a diaphragm 6' between this lens and the image-area to cut off the marginal rays of less intensity and limit the image to the desired dimension.

The form of the invention shown in Figures 5 and 6, and the modification thereof shown in Figures 7 and 8 is, in general, similar in operation to that of Figures 1 and 2 and its modification in Figures 3 and 4. It differs, however, in that I have substituted a compound lens 12', with its axis vertical, for the spherical lens 11, thereby permitting such lenses to be considered as a single lens. This cylindrical lens 12', like the lens 12, images the image 7 at the entrance-pupil of the objective 3, while the linear image 7 is formed by the lens 11' unassisted by the lens 12'.

It will be understood that in this specification, the terms "horizontal" and "vertical" have not been used in any absolute sense of the term but merely as indicating relative position or direction, and that choice between these terms has been determined merely by convenience in illustration.

I claim:

1. A linear-image-forming optical system comprising a plurality of lens components, one of said lens components including a positive spherical lens of short focal length and a positive cylindrical lens condensing the image formed thereby upon said second lens component, and the other of said lens components being of positive power and located with the image formed by the said spherical lens at a focus thereof, whereby it will form an image of said image on an image area at the other of its conjugate foci.

2. A linear-image-forming optical system comprising a plurality of lens components, one of said lens components including a positive spherical lens element forming a reduced image of the light source and a second lens element of positive cylindrical power collecting the rays from the said image and toward said second lens component, and the other of said components including a positive cylindrical lens with its axis at right angles to the first named cylindrical lens being located with the said reduced image at a focus thereof, whereby it will form a linear image of said image on an image area at the other of its conjugate foci.

JOHN A. MAURER, JR.